United States Patent [19]

Sway

[11] 4,419,235
[45] Dec. 6, 1983

[54] GRAVITY FED WATER TREATMENT APPARATUS

[76] Inventor: Boris Sway, 7201 W. Aracoma Dr., Cincinnati, Ohio 45237

[21] Appl. No.: 462,100

[22] Filed: Jan. 28, 1983

Related U.S. Application Data

[63] Continuation of Ser. No. 310,527, Oct. 13, 1981, abandoned.

[51] Int. Cl.³ .............................................. B01D 27/02
[52] U.S. Cl. .................................. 210/282; 210/472; 210/474
[58] Field of Search ............... 210/232, 237, 238, 263, 210/282, 472, 473, 474–476

[56] References Cited

U.S. PATENT DOCUMENTS

| | | | |
|---|---|---|---|
| 2,604,991 | 7/1952 | Rogers | 210/282 |
| 2,761,832 | 9/1956 | Robb | 210/282 |
| 3,220,555 | 11/1965 | Silha | 210/282 |
| 3,536,197 | 10/1970 | Ward | 210/282 |
| 3,630,683 | 12/1971 | Robb | 210/282 |
| 3,823,824 | 7/1974 | Close | 210/282 |
| 4,094,779 | 6/1978 | Behrman | 210/282 |
| 4,181,243 | 1/1980 | Frahm | 210/282 |
| 4,211,649 | 7/1980 | Sway | 210/282 |

*Primary Examiner*—Ernest G. Therkorn
*Attorney, Agent, or Firm*—Kinney and Schenk

[57] ABSTRACT

A gravity fed water treatment apparatus for drinking water removes chlorine, chlorides and other organic compounds by gravity feeding the water from one container to another at a controlled flow rate through activated carbon particles.

8 Claims, 4 Drawing Figures

GRAVITY FED WATER TREATMENT APPARATUS

This is a continuation of application Ser. No. 310,527 filed Oct. 13, 1981, now abandoned.

BACKGROUND OF THE INVENTION

The present invention relates generally to a method and apparatus for improving tap water from urban water supplies and more particularly concerns a method for reducing the quantities of free chlorine and chlorinated hydrocarbons which exist in the water. Drinking water processed according to the present invention has very noticeably improved taste characteristics.

It is long time practice to add chlorine to urban water supplies. Such chlorine is added for its germicidal effects. While the addition of chlorine has varied definite benefits, there has been much recent concern over the adverse side effects of such chlorine usage. First of all, chlorine causes an allergic reaction in many people. Secondly, it has been found that, even in dilute aqueous systems, purine and pyrimidine bases commonly found in natural water systems may react with chlorine to form compounds that are mutagenic. There is a high probability that compounds that are mutagenic are also carcinogenic. The chlorine may thus also react with purines existing in the body tissue itself causing cancer of different parts of the body. Free chlorine can also react with coffee, tea, cola and other common drinks which contain caffeine to produce chlorinated caffeine which is proven to be carcinogenic according to the Ames tests. Furthermore, chlorine and chlorinated hydrocarbons give water an adverse taste and removal of these products results in substantial improvement in the taste quality of the water.

While other germicidal additives, such as iodine, have been considered to replace chlorine, it is highly likely that chlorine will be added to urban water supplies for many years. It is thus highly desirable to remove chlorine and chlorinated hydrocarbons from these water supplies prior to drinking the water. Also, as a practical matter, any apparatus for removing the chlorine and chlorinated hydrocarbons from the water must be highly economical in order to invite widespread usage.

In the past, various types of in-line filters containing various activated carbon particles have been used. These in-line filters are subject to many disadvantages and may, in fact, prove to be dangerous. For the most part, these in-line filters are ineffective since water passing through the filters is under substantial pressure and contacts the activated carbon for only a few seconds, much less than the time applicant has found necessary to effectively remove chlorine and chlorinated hydrocarbons. Moreover, these in-line filters are subject to bacteria buildup. The plumbing work which is necessary to replace many of the in-line filters further complicates the matter and encourages use of filters beyond their useful lives. When used after bacteria buildup, water may actually be contaminated when passed through such in-line filters.

Applicant has previously proposed an effective method and apparatus for removing certain chemicals from drinking water which is disclosed in U.S. Pat. No. 4,211,649. The present invention represents an improvement over that method and apparatus which is more economical and has greater simplicity.

It is thus an object of the present invention to provide a method and apparatus for removing chlorine, chlorinated hydrocarbons and other organic compounds from drinking water in a highly economical manner.

It is a further object of the present invention to provide a method and apparatus for removing chlorine, chlorinated hydrocarbons and other organic compounds from drinking water with minimal danger of bacterial buildup.

SUMMARY OF THE INVENTION

In accordance with the invention, an apparatus for removing chlorine and chlorinated hydrocarbons from water is provided. The apparatus includes a first container which is adapted to receive a predetermined quantity of water and to serve as a resevoir for that water. The first container has a restrictive opening in its bottom portion. A second container is also provided with a disposable cartridge removably fitted to the underside of the first container in vertical alignment with the second container. The disposable cartridge is in fluid communication with the interior of the first container through the restrictive opening to receive water discharged therefrom. The disposable cartridge contains a quantity of activating carbon particles and has a bottom with a plurality of apertures of restricted size for discharging water received from the first container into the second container.

In accordance with a further aspect of the invention, the disposable cartridge is threadably fitted to the underside of the first container.

In accordance with yet another aspect of the invention, the carbon particles contained within the disposable cartridge range between 10 and 60 mesh in size.

In accordance with another aspect of the invention, the second container has a larger fluid capacity than the first container.

According to yet a further aspect of the invention, the first container has a fluid capacity of approximately one half gallon.

In accordance with a specific aspect of the invention, the bottom of the disposable container has between 1 and 6 apertures of approximately 1/16 inch diameter and the disposable cartridge has between two and three cubic inches of activating carbon particles.

BRIEF DESCRIPTION OF THE DRAWINGS

Other objects and advantages of the invention will become apparent upon reading the following detailed description and upon reference to the drawings, in which.

While the invention will be described in conjunction with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE PREFERRED EMBODIMENT

Figure 1:
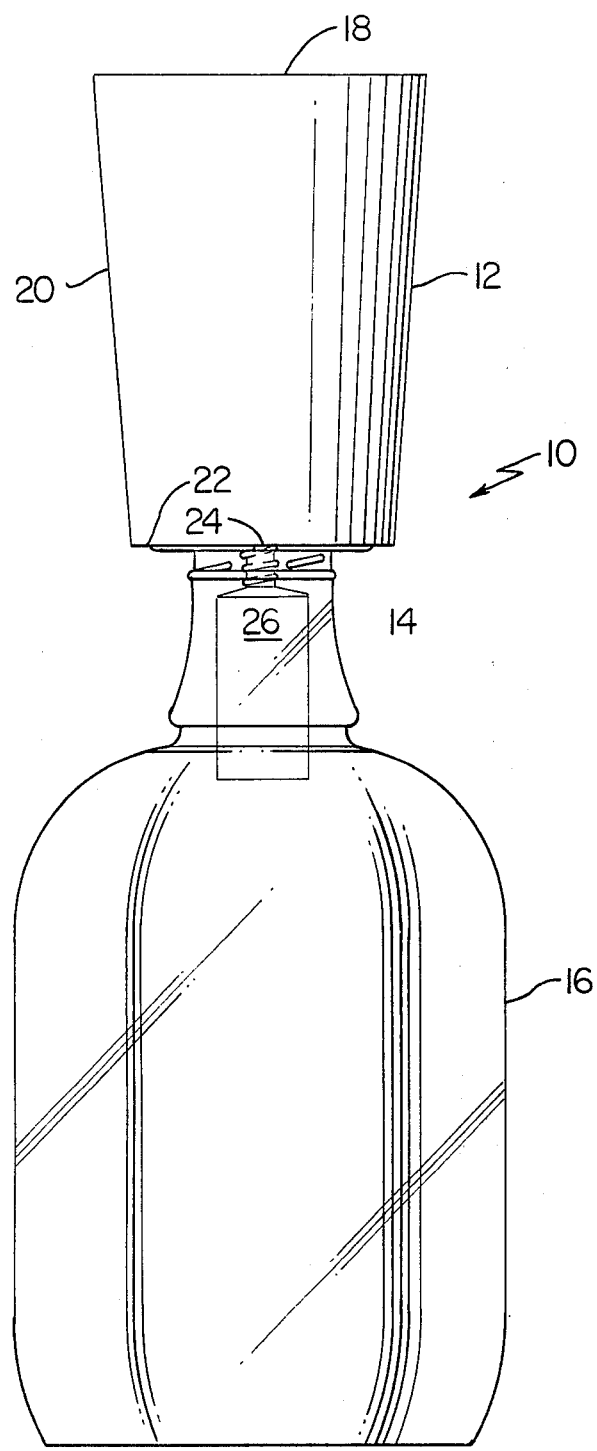
FIG. 1 is an elevational view of a water treatment apparatus constructed according to the present invention.

Referring now to the drawings and to FIG. 1 in particular, a water treatment apparatus 10 constructed in accordance to the present invention is illustrated. The apparatus 10 includes a first cup-like container forming a resevoir 12 which is fitted atop the neck 14 of a second container 16. As will be explained in greater detail later, the first resevoir forming container 12 is designed to receive water intended for drinking purposes after it has been discharged from a tap of a municipal water system, whereas the second container 16 is designed to collect and store water after it has been treated and prior to usage.

The first container 12 has a cup-like configuration with an open top over which a suitable cap (not shown) may be fitted. Generally cylindrically shaped sidewalls 20 extend downwardly from the open top 18 to a bottom 22 in a slightly converging manner. In other words, while the sidewalls 20 are generally cylindrical, the diameter of the open top 18 is slightly larger than the diameter of the bottom 22. In the preferred embodiment, the sidewalls 20 are approximately six inches in height with the diameter of the open top 18 being approximately four and one-half inches, and the diameter of the bottom 22 is approximately three and one-half inches. The bottom 22 converges downwardly to a centrally disposed aperture 24 extending through the bottom 22. In the preferred embodiment, this centrally disposed aperture 24 has a diameter of approximately one-fourth inch. In another preferred embodiment, a slightly larger first container having a capacity of approximately one-half gallon is used.

Figure 2:
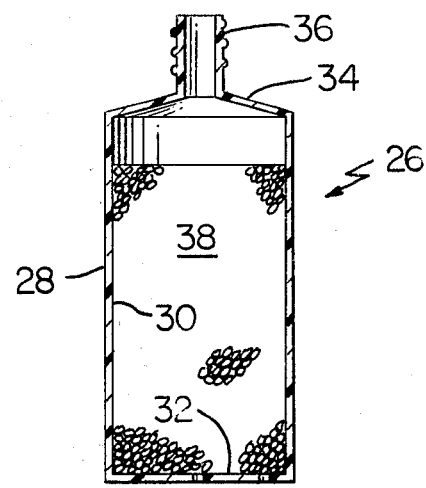
FIG. 2 is a cross sectional elevational view of a disposable cartridge used in the embodiment of FIG. 1.

A disposable cartridge 26 is threadably received by threads about the periphery of aperture 24 to position the cartridge 26 beneath and in open fluid communication with the resevoir defined by the first container 12. This disposable cartridge 26 is perhaps more clearly illustrated in the depiction of FIG. 2. From FIG. 2, it may be seen that the cartridge 26 has a main body portion 28 defined by cylindrically shaped sidewalls 30, a bottom 32, and a top 34. The top 34 extends into a neck portion 36 which is threaded on its exterior periphery for connection with the aperture 24 in the first container 12. The preferred disposable cartridge 26 has a main body (28) height of approximately two and one-half inches and a diameter of approximately one and one quarter inches. The neck 26 extends approximately one-half inch upwardly from the main body 28. As also seen in FIG. 2, the cartridge 26 contains a quantity of activated carbon particles 38, which carbon particles 38 are contained in approximately the bottom two inches of the body portion 28. These carbon particles 38 and 10 to 60 mesh in size. Thus in the preferred embodiment, the disposable cartridge contains between approximately two and three cubic inches or one-half ounce of activated carbon particles 38.

Figure 3:
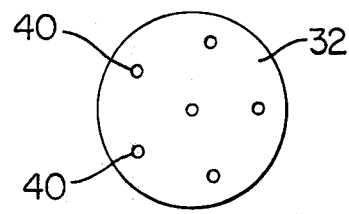
FIG. 3 is a bottom view of the disposable cartridge illustrated in FIG. 2 depicting a plurality of apertures extending through the bottom of the cartridge.

FIG. 3 shows the bottom portion 32 of the disposable container 26. This bottom 32 has a plurality of apertures 40 extending therethrough. In the preferred embodiment, approximately 1-6 apertures of approximately 1/16 inch diameter are used. Apertures of this number and size will produce a flow rate between 0.0125 and 0.02 gallons per minute with the described embodiment when approximately one quart of the water is supplied.

When the disposable cartridge 26 is threadably fitted to the resevoir container 12 and disposed within the neck 14 of the second container 16, water supplied to the resevoir 12 will be gravity forced through the disposable cartridge 26 and forced into contact with the activated carbon particles contained therein. The parameters described above permit the resevoir to initially receive approximately one quart of water and to pass the water through the cartridge 26 at a rate that will produce steady droplets of water through the bottom 32 of the cartridge. It has been found that this flow rate through the cartridge 26 will result in removal of virtually all free chlorine in the water and will remove approximately 70 percent of the chlorinated hydrocarbons. It has also been found that substantially faster flow rates will be considerably less effective in chlorine removal. At the preferred rate steady droplet of flow, it would take approximately 18 minutes to treat a quart of water. It is thus highly desirable to collect the treated water in a second container such as depicted at 16 and to use the second container 16 to store sufficient quantities for drinking purposes for a reasonable period of time.

As will be apparent to those skilled in the art, devices of different sizes and dimensions will also operate effectively. It is important, however, that the parameters of the device be adjusted so as to force the duration of the contact between the water and the activated carbon particles to be sufficiently long. Applicant has found that optimum contacting duration will be achieved by passing the water through approximately two inches of activated carbon particles at a flow rate between 0.0125 and 0.02 gallons per minute. As will be apparent to those skilled in the art, higher flow rates could be utilized with correspondingly lengthened heights of activated carbon particles. However, this designated flow rate has been found most suitable for gravity fed systems for home use.

It is highly desirable to insure that the level of water in the container 16 is below the bottom 32 of the disposable cartridge 26. Applicant has found that allowing the cartridge 26 to become submerged in the water in the container 16 will result in substantially higher bacteria counts for the treated water. Thus, while the disposable cartridge is not designed to remove bacteria from the water, care must be taken to insure that the use of the apparatus does not increase the bacteria in the drinking water.

Figure 4:
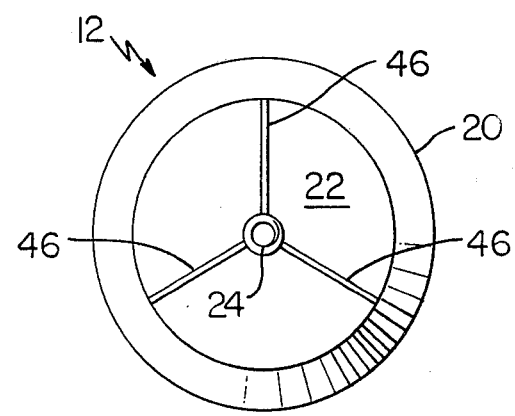
FIG. 4 is a bottom view of the uppermost of the containers depicted in FIG. 1 illustrating a plurality of radially extending ridges on the bottom of the container which serve to establish an air gap when this first container in rested upon a second container.

FIG. 4 depicts the bottom side of the first resevoir container 12 and illustrates equally spaced radially extending ridges 46. These ridges 46 are disposed on the bottom of the first container 12 and insure that an air space is provided between the first and second containers 12 and 16 when the former 12 is rested upon the latter. This air gap, which is formed in the spaces between the ridges 46, permits escape of air displaced by the water discharged from apertures 40 in disposable cartridge 26.

It has been seen that the above described apparatus is very simple to construct and to operate. This simplicity has the economic benefit of enabling a user to remove chlorine, chlorides and other organic compounds from his own personal drinking water at a very low cost. The cartridge 26 is made to be disposable and the threaded connection with the resevoir 12 is designed to very easily enable a user to remove a spent cartridge and to replace it quickly and easily with a new cartridge. The spent cartridge is then merely thrown away.

Thus it is apparent that there has been provided, in accordance with the invention, an apparatus that fully satisfies the objects, aims, and advantages set forth above. While the invention has been described in conjunction with a specific embodiment thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An apparatus for removing chlorine, chlorinated hydrocarbons and other organic materials from drinking water, comprising:
   (a) a first container having an open top for receiving water and a restricted opening in its bottom portion for discharging water, said container having slightly converging vertical walls for receiving a predetermined quantity of water and to serve as a temporary reservoir for the water, said restricted opening having threads about its periphery;
   (b) a disposable cartridge containing at least one-half ounce of activated carbon particles ranging between 10 and 60 mesh in size, said disposable cartridge having a vertical length of at least two inches and a diametral dimension of approximately one inch and being threadably connected to and in open fluid communication with the restricted opening in the first container, said disposable cartridge having a plurality of apertures in its bottom portion said first container and said disposable cartridge being dimensioned so as to discharge water through said plurality of apertures at a flow rate between approximately 0.0125 and 0.02 gallons per minute when said predetermined quantity of water is placed in said first container;
   (c) a second container having a larger capacity than the first container, having a top opening sized to receive said cartridge and having a first container-supporting top surface, said disposable cartridge being at least partially disposed within the second container to discharge water passing into the second container; and
   (d) a plurality of ridges on the bottom of said first container, extending radially outward from said restricted opening across and contacting said top surface of the first container when the disposable cartridge is disposed within the second container.

2. An apparatus as recited in claim 1 wherein said first container has a capacity of approximately ½ gallon.

3. An apparatus as recited in claim 1 wherein the bottom of said disposable cartridge has between 1 and 6 aperatures over approximately 1/16 of an inch in diameter.

4. An apparatus as recited in claim 1 wherein the quantity of carbon particles contained with said disposable cartridge is approximately 2 to 3 cubic inches.

5. An apparatus as recited in claim 1 wherein the diameter of the restricted opening in the bottom of said first container is approximately 1⅛" in diameter.

6. An apparatus as recited in claim 1 wherein water is gravity fed from said first to said second containers.

7. An apparatus as recited in claim 1 further including means for establishing an air gap between the first and second containers.

8. An apparatus as recited in claim 1 wherein water is gravity fed from the first to the second containers.

* * * * *